United States Patent
Van Der Merwe et al.

(10) Patent No.: US 8,161,155 B2
(45) Date of Patent: Apr. 17, 2012

(54) FILTERING UNWANTED DATA TRAFFIC VIA A PER-CUSTOMER BLACKLIST

(75) Inventors: Jacobus Erasmus Van Der Merwe, New Providence, NJ (US); Karim El Defrawy, Irvine, CA (US); Balachander Krishnamurthy, New York, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 165 days.

(21) Appl. No.: 12/286,213

(22) Filed: Sep. 29, 2008

(65) Prior Publication Data

US 2010/0082811 A1    Apr. 1, 2010

(51) Int. Cl.
*G06F 15/173*    (2006.01)
*G06F 15/16*    (2006.01)

(52) U.S. Cl. ......... 709/225; 709/223; 709/224; 709/232
(58) Field of Classification Search .................. 709/232, 709/223–225; 726/1–21
See application file for complete search history.

(56) References Cited

U.S. PATENT DOCUMENTS

| | | | | |
|---|---|---|---|---|
| 6,330,610 | B1 * | 12/2001 | Docter et al. | 709/229 |
| 6,725,378 | B1 | 4/2004 | Schuba et al. | |
| 6,789,203 | B1 | 9/2004 | Belissent | |
| 7,206,814 | B2 * | 4/2007 | Kirsch | 709/206 |
| 7,668,951 | B2 * | 2/2010 | Lund et al. | 709/223 |
| 7,676,566 | B2 * | 3/2010 | Lund et al. | 709/223 |
| 2003/0191969 | A1 * | 10/2003 | Katsikas | 713/201 |
| 2004/0117478 | A1 * | 6/2004 | Triulzi et al. | 709/224 |
| 2005/0015626 | A1 | 1/2005 | Chasin | |
| 2006/0010389 | A1 | 1/2006 | Rooney et al. | |
| 2006/0031483 | A1 * | 2/2006 | Lund et al. | 709/224 |
| 2006/0167871 | A1 | 7/2006 | Sorenson et al. | |
| 2006/0230444 | A1 | 10/2006 | Iloglu et al. | |
| 2006/0236401 | A1 | 10/2006 | Fosdick | |
| 2007/0162587 | A1 * | 7/2007 | Lund et al. | 709/223 |
| 2007/0204026 | A1 * | 8/2007 | Berger | 709/223 |
| 2008/0104235 | A1 * | 5/2008 | Oliver et al. | 709/224 |
| 2008/0134327 | A1 | 6/2008 | Bharrat et al. | |

OTHER PUBLICATIONS

Verkaik, Peter et al., "PRIMED: Community-of-Interest-Based DDoS Mitigation", SIGCOMM '06 Workshops, Sep. 11-15, 2006.

* cited by examiner

*Primary Examiner* — David Lazaro
*Assistant Examiner* — Edward Kim

(57) ABSTRACT

Traffic flow from a traffic source with a source IP address to a customer system with a destination IP address is filtered by comparing the source IP address to a customer blacklist. If the source IP address is on the customer blacklist, then traffic to the customer system is blocked; else, traffic to the customer system is allowed. The customer blacklist is generated from a network blacklist, comprising IP addresses of unwanted traffic sources, and a customer whitelist, comprising IP addresses of wanted traffic sources. The customer blacklist is generated by removing from the network blacklist any IP address also on the customer whitelist. The network blacklist is generated by acquiring raw blacklists from reputation systems. IP addresses on the raw blacklists are sorted by prefix groups, which are rank ordered by traffic frequency. Top prefix groups are selected for the network blacklist.

12 Claims, 6 Drawing Sheets

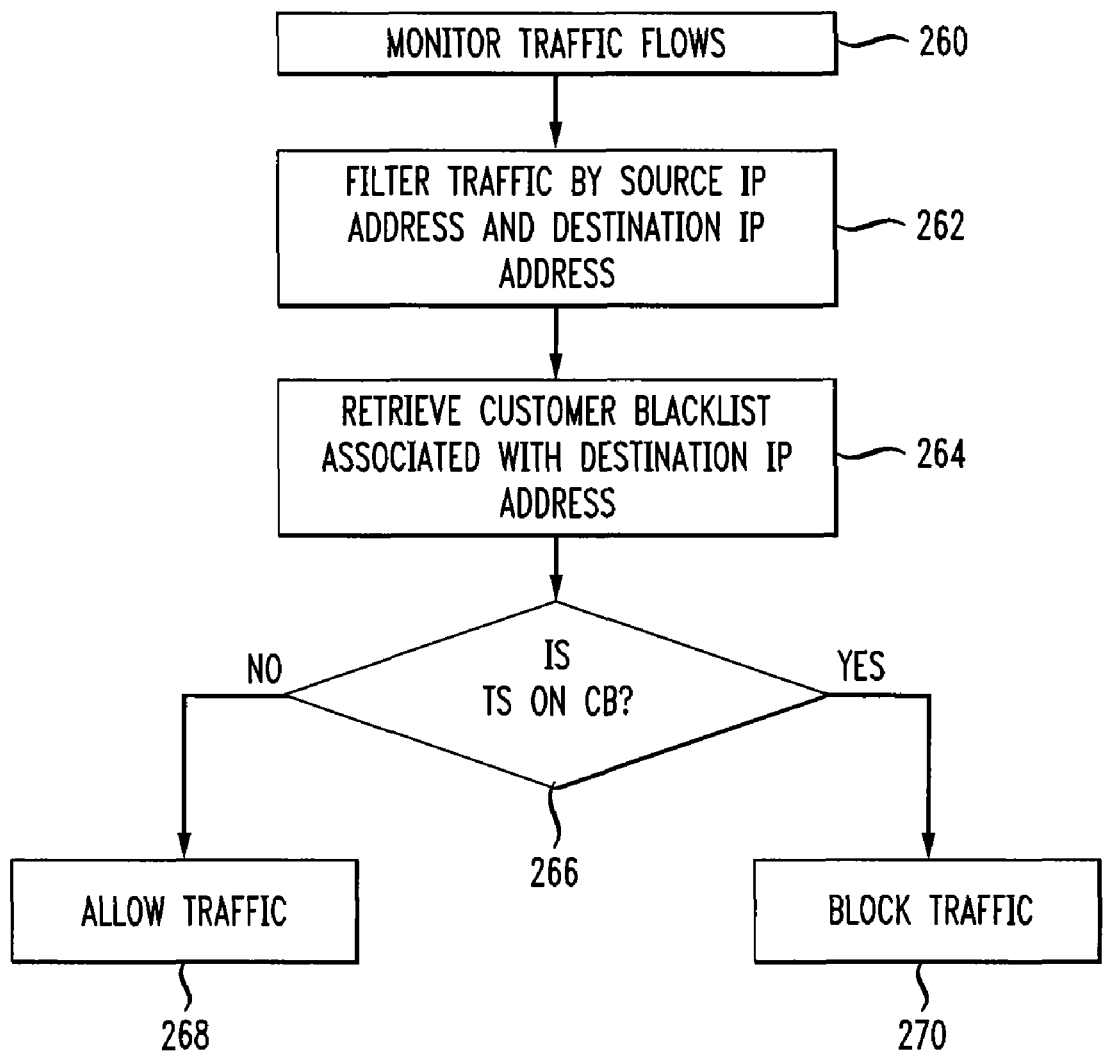

FIG. 3

| TS | | 319 b_19 | 320 b_20 | 321 b_21 | 322 b_22 | 323 b_23 | 324 b_24 | 325 b_25 | 326 b_26 | 327 b_27 | 328 b_28 | 329 b_29 | 330 b_30 | 331 b_31 | f | |
|---|---|---|---|---|---|---|---|---|---|---|---|---|---|---|---|---|
| | | | | | PREFIX BITS | | | | | HOST BITS | | | | | | |
| | | | | | | | IP ADDRESS BITS | | | | | | | | | |
| 300 ~ [TS0] | 350 ~ | 1 | 1 | 1 | 1 | 1 | X | X | X | X | X | X | X | X | 28342 ~ | 340 |
| 301 ~ [TS1] | 351 ~ | 1 | 1 | 1 | 1 | 1 | 0 | 0 | 0 | 1 | 1 | 0 | 1 | 1 | 9995 ~ | 341 |
| 302 ~ [TS2] | 352 ~ | 1 | 1 | 1 | 1 | 1 | 0 | 0 | 0 | 1 | 1 | 1 | 1 | 0 | 9402 ~ | 342 |
| 303 ~ [TS3] | 353 ~ | 1 | 1 | 1 | 1 | 1 | 0 | 0 | 0 | 1 | 1 | 0 | 0 | 1 | 8945 ~ | 343 |
| 304 ~ [TS4] | 354 ~ | 1 | 1 | 1 | 0 | 0 | X | X | X | X | X | X | X | X | 7568 ~ | 344 |
| 305 ~ [TS5] | 355 ~ | 0 | 0 | 0 | 0 | 1 | X | X | X | X | X | X | X | X | 5389 ~ | 345 |
| 306 ~ [TS6] | 356 ~ | 1 | 0 | 1 | 0 | 0 | X | X | X | X | X | X | X | X | 4013 ~ | 346 |
| 307 ~ [TS7] | 357 ~ | 0 | 1 | 0 | 1 | 1 | X | X | X | X | X | X | X | X | 1427 ~ | 347 |
| 308 ~ [TS8] | 358 ~ | 1 | 0 | 0 | 0 | 0 | X | X | X | X | X | X | X | X | 976 ~ | 348 |
| 309 ~ [TS9] | 359 ~ | 0 | 0 | 1 | 0 | 0 | X | X | X | X | X | X | X | X | 425 ~ | 349 |

FILTERING UNWANTED DATA TRAFFIC VIA A PER-CUSTOMER BLACKLIST

BACKGROUND OF THE INVENTION

The present invention relates generally to data networks, and more particularly to filtering unwanted data traffic to a specific customer.

The open access architecture of the Internet provides a high degree of utility for a user to communicate with other users and to access applications on a vast array of network servers. As the Internet has grown from a small community of trusted users to an unorganized global population of users, however, the open access architecture has also become a liability. Large streams of unwanted data traffic now routinely degrade both network and user operations. Well known examples of unwanted data traffic range from e-mail spam, which consumes network resources and wastes users' time, to malicious distributed denial-of-service (DDos) attacks, which may effectively shut down network operations, applications servers, and personal computers.

One approach for reducing unwanted data traffic is to compare a specific source of a data traffic stream against a "blacklist" of data traffic sources which historically have been sources of unwanted data traffic. If the specific source is on the blacklist, then data traffic from the specific source may be filtered and blocked. A blacklist may be maintained in the network, in the user system, or in both the network and in the user system. A blacklist, for example, may contain a raw list of the Internet Protocol (IP) addresses of servers which are known sources of unwanted data traffic. There are several major disadvantages of this approach, however. For example, since the number of sources of unwanted data traffic is large and continues to grow, and since IP addresses of servers may be changed, maintaining and updating a blacklist of individual IP addresses may consume considerable network and user resources. The process of checking a specific source against a large blacklist, furthermore, may itself increase response times and degrade network operations and user applications. In addition, a blacklist may not be effective against unwanted data traffic generated by normally benign servers or personal computers whose operations have been seized by malicious software.

From a user's perspective, a filter which removes unwanted data traffic, in principle, should not inadvertently remove wanted data traffic. What constitutes wanted and unwanted data traffic, however, is dependent on a specific user. What are needed are method and apparatus which has the capability of filtering unwanted data traffic from a large-scale network, and, at the same time, may be customized for a specific user.

BRIEF SUMMARY OF THE INVENTION

In an embodiment, a customer blacklist is generated from a network blacklist and a customer whitelist. The network blacklist comprises a list of Internet Protocol (IP) addresses identifying unwanted traffic sources. The customer whitelist comprises a list of IP addresses identifying wanted traffic sources for a specific customer. The customer blacklist is generated by removing from the network blacklist any IP address that is also on the customer whitelist.

The customer whitelist is generated by analyzing a customer historical usage pattern. The network blacklist is generated by acquiring raw blacklists from reputation systems. A raw blacklist comprises a list of IP addresses identifying unwanted traffic sources. The IP addresses on the raw blacklists are consolidated into a single list and sorted by prefix groups with a network-specified prefix length. The prefix groups are rank ordered by traffic frequency. The top prefix groups are selected for the network blacklist. In an embodiment, prefix groups are further sorted by prefix subgroups rank ordered by traffic frequency. The top prefix subgroups are selected for the network blacklist.

Traffic flow from a traffic source identified by a source Internet Protocol (IP) address to a customer system identified by a destination IP address is filtered by comparing the source IP address to a list of IP addresses on the customer blacklist associated with the customer system. If the source IP address is on the customer blacklist, then the traffic flow to the customer system is blocked. If the source IP address is not on the customer blacklist, then the traffic to the customer system is allowed.

These and other advantages of the invention will be apparent to those of ordinary skill in the art by reference to the following detailed description and the accompanying drawings.

BRIEF DESCRIPTION OF THE DRAWINGS

FIG. 2(d) shows a flowchart of steps for blocking unwanted traffic;
FIG. 3 shows an example of a network blacklist constructed as a filter table.

DETAILED DESCRIPTION

Figure 1:
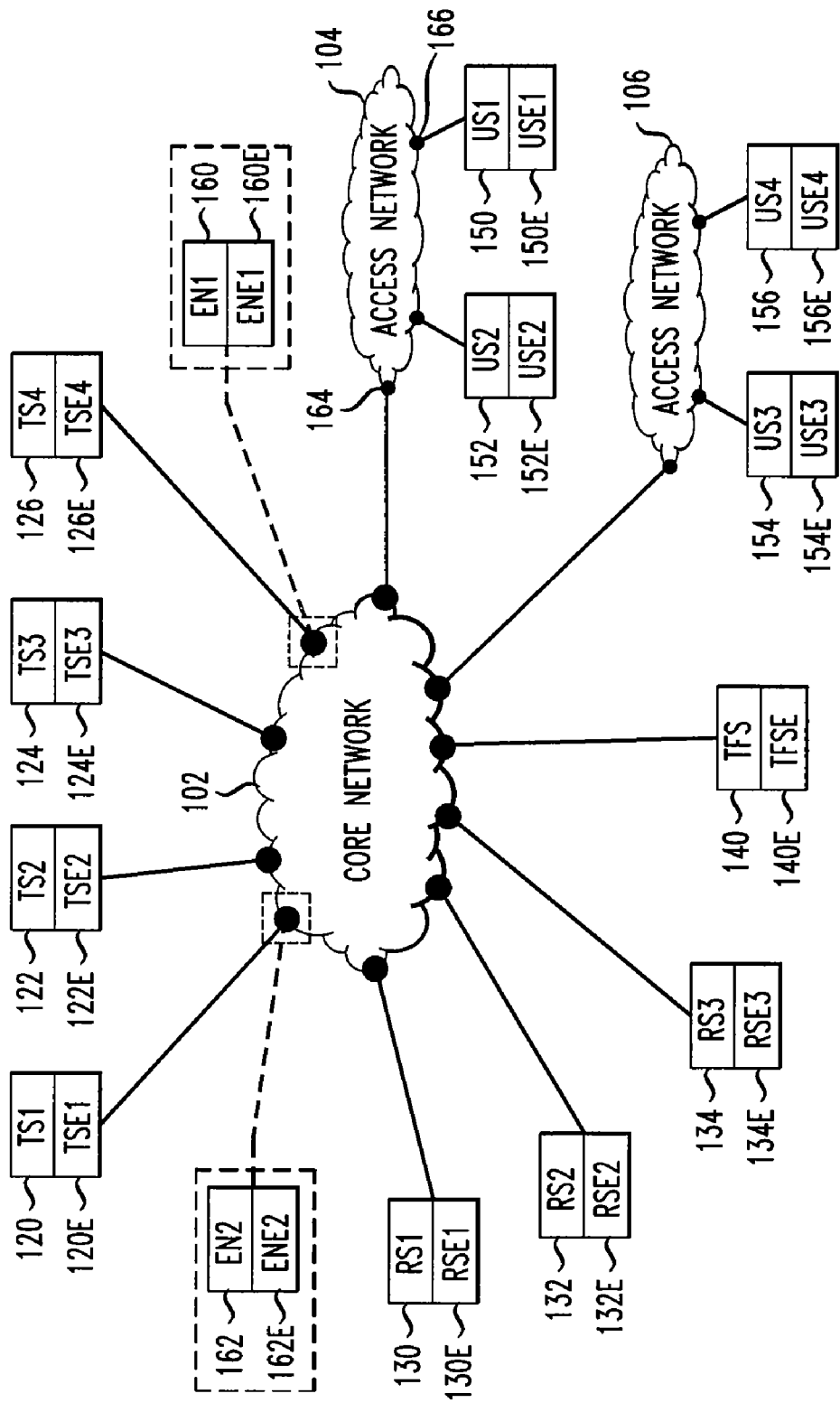
FIG. 1 shows a high-level schematic of a data network.

FIG. 1 shows a high-level schematic of a data network. Shown are both functional elements and their corresponding equipment. Herein, the equipment corresponding to a functional element refers to the hardware and software which implements the functional element. In FIG. 1, the following convention is used. The equipment corresponding to Func-tionalElement 1xy, where 1xy is the reference number, is denoted FunctionalElementE 1xyE. Herein, a node refers to a functional element which provides a connection between a functional element and a network or a connection between a functional element and another functional element. Herein, functional elements include both functional elements in a transport network and functional elements in an end-user system.

In general, multiple access networks may be connected to a core network, and multiple user systems may be connected to an access network. In FIG. 1, for example, access network 104 and access network 106 are connected to core network 102. User system US1 150 and user system US2 152 are connected to access network 104. User system US3 154 and user system US4 156 are connected to access network 106. An example of user equipment USE1 150E is a personal computer operated by a customer of an Internet Service Provider (ISP).

Access network 104 is connected to core network 102 via edge node EN1 160, residing in core network 102, and access node 164 residing in access network 104. An example of edge node equipment ENE1 160E is an edge router. User system US1 150 connects to access network 104 via access node 166.

Details of access node 164 and access node 166 are not shown. In the example shown in FIG. 1, the ISP operates core network 102, access network 104, and access network 106. The ISP has administrative access to details of traffic flow in the three networks. The ISP, for example, may have administrative privileges to routers in the three networks. Herein, traffic refers to data traffic, and a traffic flow refers to a data stream. One skilled in the art may develop embodiments for networks which have multiple service providers and multiple network administrators.

Connected to core network 102 are multiple traffic sources (TSs), denoted TS1 120-TS4 126 in FIG. 1. Examples of traffic sources include web servers, application servers, multi-media servers, and e-mail servers. Examples of the corresponding equipment, denoted TSE1 120E-TSE4 126 E, include network servers, workstations, and personal computers. In general, a traffic source is connected to a core network via an access network. To simplify FIG. 1, TS1 120-TS4 126 are shown as directly connected to core network 102. In the example shown in FIG. 1, the ISP does not have administrative control over TS1 120-TS4 126. Traffic sources may also include user systems, such as US3 154, which, in general, are not controlled by the ISP.

Also connected to core network 102 are multiple reputation systems (RSs), denoted RS1 130-RS3 134. Examples of the corresponding equipment, denoted RSE1 130E-RSE3 134E, include network servers, workstations, and personal computers. To simplify FIG. 1, RS1 130-RS3 134 are shown as directly connected to core network 102. In general, a reputation system is connected to a core network via an access network.

In an embodiment, RS1 130-RS3 134 maintain databases which include lists of traffic sources which historically have generated unwanted traffic. Herein, a traffic source which generates unwanted traffic is referred to as an unwanted traffic source, and a list of unwanted traffic sources is referred to as a blacklist. Herein, a traffic source which generates wanted traffic is referred to as a wanted traffic source, and a list of wanted traffic sources is referred to as a whitelist. Reputation systems may also maintain whitelists. Herein, wanted and unwanted traffic are specified by user-defined criteria.

Blacklists may be derived, for example, from e-mail spam logs, firewall logs, databases from anti-spyware software, and databases from anti-virus software. Blacklists may also contain user-specified entries. Whitelists, for example, may be derived from certificates issued by certification authorities. Whitelists may also contain user-specified entries. Construction of whitelists are discussed in further detail below.

Also connected to core network 102 is a traffic filter system (TFS). In general, a traffic filter system connects to a core network via an access network. To simplify FIG. 1, TFS 140 is shown as directly connected to core network 102. In the example shown in FIG. 1, there is a single TFS, denoted TFS 140. One skilled in the art may develop embodiments for networks containing multiple TFSs. Examples of the corresponding equipment, denoted TFSE 140E, include network servers, workstations, and personal computers. In an embodiment, TFS 140 monitors traffic flows to and from traffic sources TS1 120-TS4 126 and monitors traffic flows to and from user systems US1 150-US4 156. Traffic filter system TFS 140 also accesses the databases in RS1 130-RS3 134. In general, TFS 140 may monitor all traffic flows across core network 102, access network 104, and access network 106.

Herein, a traffic filter system refers to a functional element which sorts traffic into wanted traffic and unwanted traffic. In response to user-defined criteria, a traffic filter system may block unwanted traffic, and allow wanted traffic, from a specific source to a specific destination. A specific destination, for example, may be a specific user system, a specific network server, or a specific network node. In an embodiment, a traffic filter system may also perform other network administration functions. For example, it may redirect traffic to a network analyzer or redirect traffic to a data storage system. For example, traffic may be captured, stored, and post-processed to develop blacklists and whitelists.

Traffic filter system TFS 140 may filter traffic on a per-network basis, such as all traffic flowing from core network 102 to access network 104. Traffic filter system TFS 140 may also filter traffic on a per-user basis, such as all traffic flowing from core network 102 to user system US1 150. In an embodiment, traffic may be filtered at various nodes. For example, traffic may be filtered at the edge node at which a traffic source connects to the core network. In FIG. 1, for example, traffic from traffic source TS1 120 to core network 102 may be filtered at edge node EN2 162. Traffic may also be filtered at the nodes by which an access network for user systems connects to a core network. For example, traffic from traffic source TS1 120 to user system US1 150 may be further filtered at edge node 160, access node 164, and access node 166.

Traffic filter systems may be bidirectional. For example, traffic from access network 104 to core network 102 may be filtered at edge node 160 and access node 164. As another example, traffic from user system US1 150 to access network 104 may be filtered at access node 166. It is advantageous to filter traffic at edge node 160, access node 164, and access node 166 in the event that US1 150 is a source of unwanted traffic (either deliberately or because its security has been compromised). Traffic may also be filtered at intermediate nodes (not shown) within core network 102, access network 104, and access network 106. In general, it is advantageous to filter traffic as close to a traffic source as possible in order to reduce unwanted traffic from being propagated further down a network path.

As discussed above, however, the criteria for unwanted traffic is user-specific. A traffic filter system yields a false positive if it blocks traffic which a user considers to be wanted. A traffic filter system yields a false negative if it allows traffic which a user considers to be unwanted. Reducing the number of false positives and the number of false negatives is advantageous for efficient utilization of network and user resources. In an embodiment, filtering is performed through a combination of network-specific and user-specific criteria. As discussed above, network-level filtering (at various nodes, for example) is advantageous to reduce overall traffic loading in the network. In an embodiment, modification of network-level filtering by user-specific criteria reduces the number of false positives and false negatives.

Herein, a customer refers to an end-user of network services. A customer, for example, may operate user system US1 150. A user system operated by a customer is also referred to as a customer user system. Herein, a network administrator refers to an operator who has administrative access to network equipment, such as network servers, routers, and switches, in a network. As discussed above, one skilled in the art may develop embodiments for networks with one network administrator or multiple network administrators. For example, there may be a single network administrator for core network 102, access network 104, and access network 106. In another example, there may be a separate network administrator for each of core network 102, access network 104, and access network 106. In the examples discussed below, there is a single network administrator. Input and criteria specified by a customer are also referred to as customer-specified input and customer-specified criteria. Input and criteria specified by a network administrator are also referred to as network-specified input and network-specified criteria.

Figure 2A:
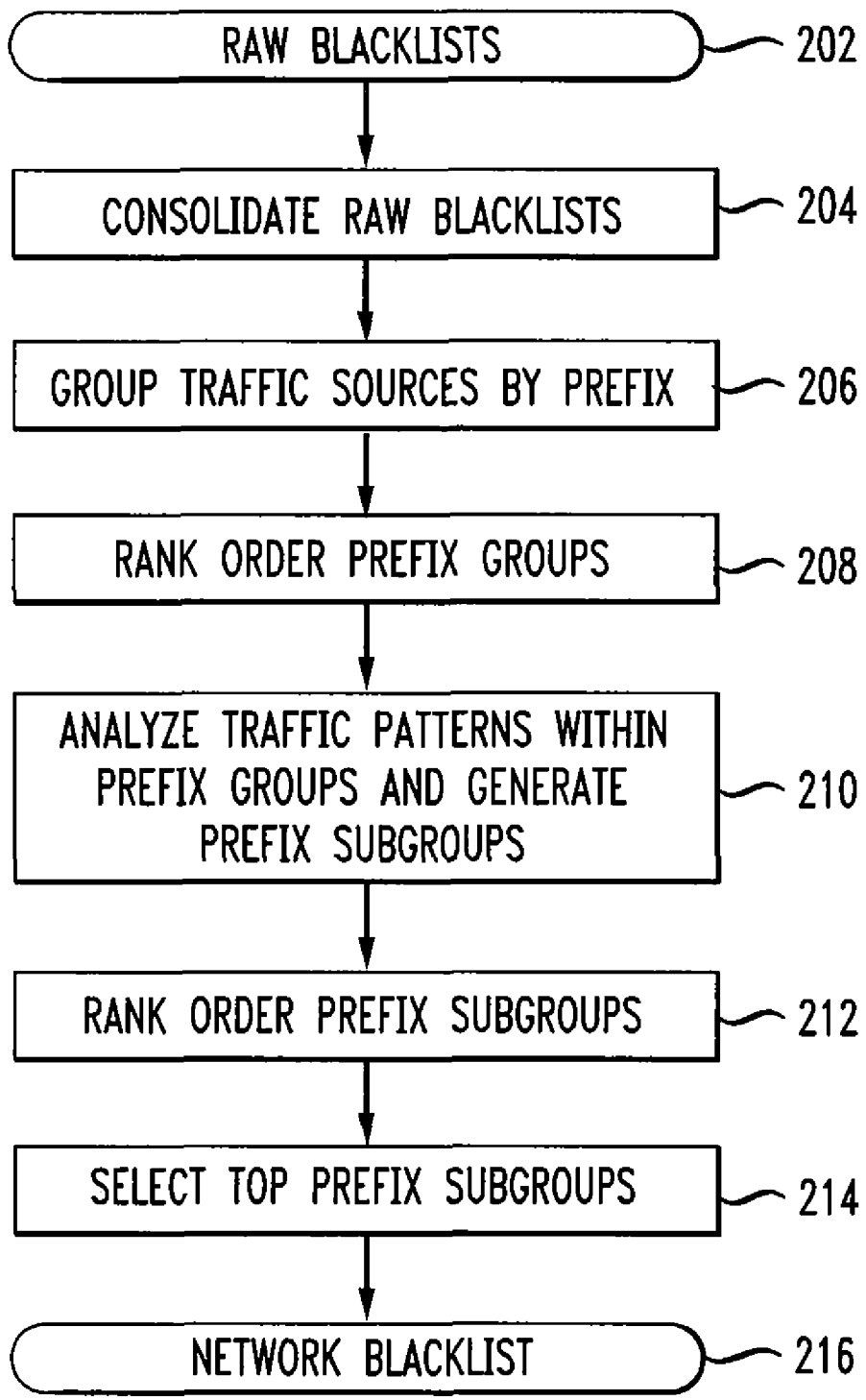
FIG. 2(a) shows a flowchart of steps for generating a network blacklist.
Figure 2B:
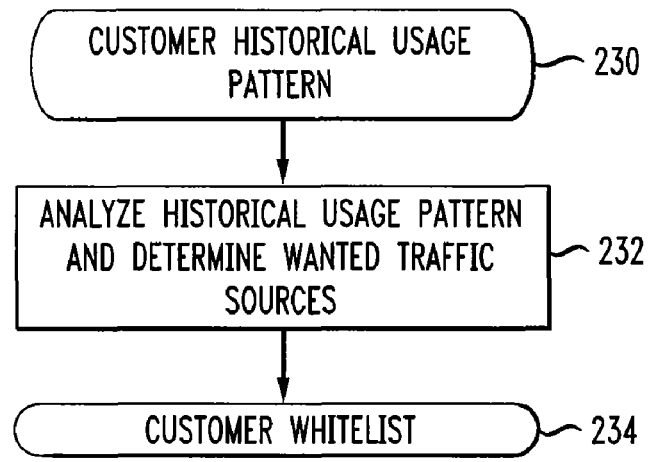
FIG. 2(b) shows a flowchart of steps for generating a customer whitelist.
Figure 2C:
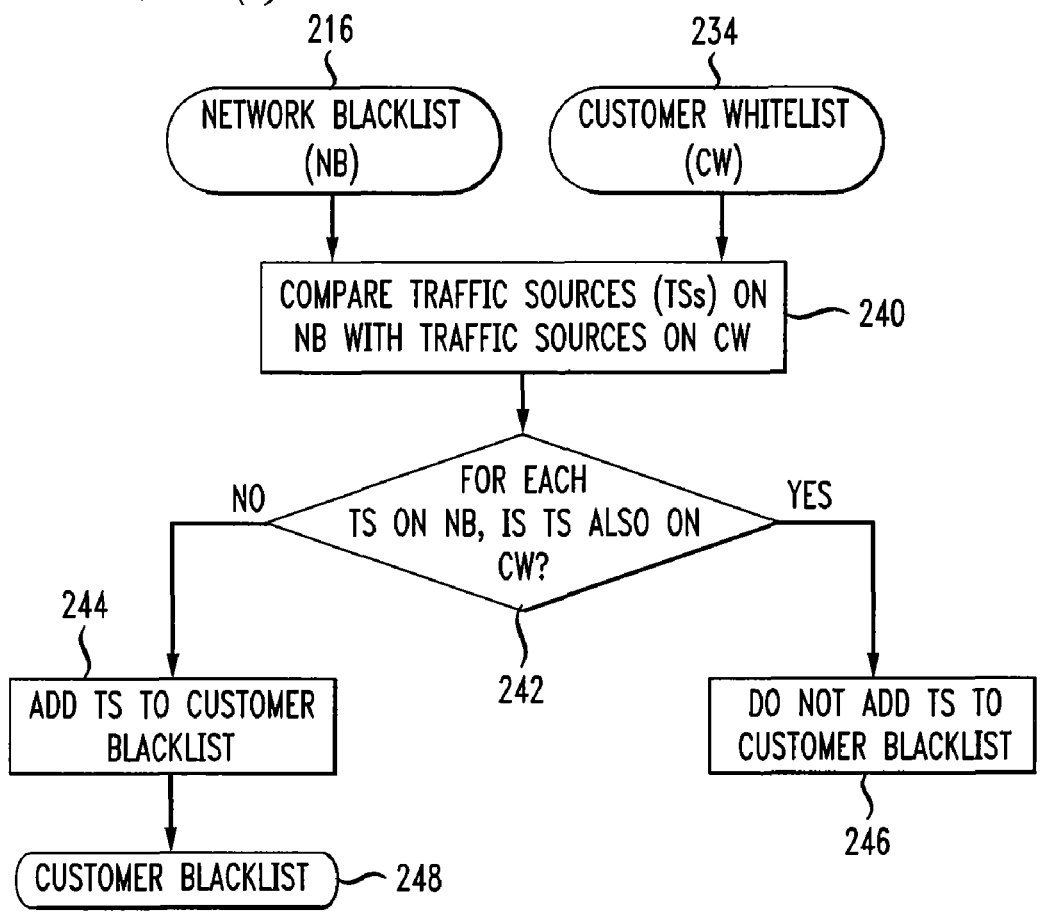
FIG. 2(c) shows a flowchart of steps for generating a customer blacklist.

FIG. 2(a)-FIG. 2(d) show flowcharts of steps for filtering unwanted traffic to a specific customer, according to an embodiment. In the following, also refer to the network schematic in FIG. 1 and the filter table in FIG. 3. FIG. 2(a) shows steps for generating a network blacklist. FIG. 2(b) shows steps for generating a customer whitelist. FIG. 2(c) shows steps for generating a customer blacklist. FIG. 2(d) shows steps for filtering unwanted traffic based at least in part on a customer blacklist.

In FIG. 2(a), a set of raw blacklists 202 is acquired from reputation systems RS1 130-RS3 134 as input to traffic filter system TFS 140. Additional raw blacklists may also be inputted by the network administrator. A raw blacklist refers to a blacklist which has not been processed by traffic filter system 140. In step 204, TFS 140 consolidates the multiple raw blacklists into a single list of unwanted traffic sources, referred to herein as a consolidated raw blacklist. The process then passes to step 206.

In an embodiment, traffic sources, such as TS1 120-TS4 126, are identified by their Internet Protocol (IP) addresses. In practice, an IP address may be assigned to equipment, such as TSE1 120E-TSE4 126E. To simplify the terminology herein, an IP address identifies both the functional element and the equipment corresponding to the functional element. In the examples discussed herein, IPv4 (32-bit) addresses are used. One skilled in the art may apply embodiments to IPv6 (128-bit) addresses. An IP address may be decomposed into two fields: a network address field and a host address field. A network address refers to a set of hosts to which traffic may be routed. A host address refers to a specific host to which traffic may be routed. Herein, a host refers to a specific piece of equipment to which traffic may be routed. Examples of hosts include routers, Ethernet switches, servers, workstations, and personal computers. Referring to FIG. 1, examples of hosts are TSE1 120E, ENE1 160E, RSE1 130E, TFSE 140E, and USE1 150E. Herein, a host also refers to the functional element corresponding to the piece of equipment.

There are several methods for designating the network address and the host address fields in an IP address. For example, the IP address may be written in a standard dotted decimal notation (such as IP address=135.5.120.16), in which the network address is specified by its default network class. The network address may also be modified by the addition of a subnet mask (such as IP address=135.5.132.87, subnet mask=255.255.255.0).

In embodiments herein, IP addresses are written in prefix format:

IP address=$b_0, b_1, \ldots b_{30}, b_{31}/p$, where $b_0, b_1, \ldots b_{30}, b_{31}$ is a 32-bit binary string and p is the prefix length. The prefix length specifies that the first p-bits of the binary string represent the network address and the remaining bits represent the host address:

network address=$b_0, b_1, \ldots b_{p-1}$ host address=$b_p, b_{p+1}, \ldots b_{31}$.

The prefix length, for example, may be specified in routing tables in routers which interoperate via the border gate protocol (BGP). This information may be accessed by the network administrator. One skilled in the art may develop other embodiments for acquiring prefix lengths of IP addresses. For example, an approximate prefix length may be inferred from the default network class associated with the equivalent dotted decimal IP address.

Returning to FIG. 2(a), in step 206, IP addresses of traffic sources on the consolidated raw blacklist are grouped by prefixes, with a prefix length $p \geq N$. The minimum prefix length N is specified by the network administrator. As N increases, the range of host IP addresses decreases, and the traffic filter system becomes more selective. The likelihood of false positives and false negatives may decrease; however, filtering efficiency (based on computational resources such as memory and computational time) may decrease. As N decreases, a larger set of hosts may be efficiently filtered out; however, a higher rate of false positives and false negatives may result. One skilled in the art may select a value of N based on network-specified criteria, such as historical experience or heuristics, optimized for specific networks. Herein, a group of hosts whose IP addresses have the same prefix is referred to as a prefix group.

The process then passes to step 208, in which a structured list is generated. The prefix groups are rank-ordered by traffic frequency from each specific prefix group. The prefix group with the highest traffic frequency is at the top of the list. Herein, traffic frequency f refers to a network-specified parameter which characterizes traffic volume. Examples of traffic frequency are number of connection attempts or number of bytes of data transmitted over a network-specified time interval (for example, the past seven days). In an embodiment, a prefix group may be decomposed into prefix subgroups, wherein a prefix subgroup is a subset of a prefix group. For example, if a prefix group contains 254 hosts, a prefix subgroup may contain a subset of 32 hosts. Within a prefix group, there may be multiple prefix subgroups. The sizes of the prefix subgroups may vary. Herein, a prefix subgroup may also refer to the entire prefix group (that is, a prefix subgroup is an improper subset of a prefix group). Note that a prefix subgroup may contain a single element (that is, a single host).

A list of prefix groups rank-ordered by traffic frequency may be constructed as a filter table, an example of which is shown in FIG. 3. Herein, a filter table is populated with table entries. To distinguish reference numbers from table entries, reference numbers are written in bold, underlined font, such as 301. Seven prefix groups, [TS0] 300 and [TS4] 304-[TS9] 309, are rank ordered by traffic frequency. To simplify the table, it is assumed that the first 19 prefix bits ($b_0, b_1, \ldots b_{18}$) of the IP addresses of [TS0] 300 and [TS4] 304-[TS9] 309 are the same. The last bits are tabulated in columns $b_{19}$ 319-$b_{31}$ 331. The prefix bits in this example are $b_{19}$ 319-$b_{23}$ 323 (that is, N=24). The host bits are $b_{24}$ 324-$b_{31}$ 331. The set of IP addresses 350 and 354-359 correspond to [TS0] 300 and [TS4] 304-[TS9] 309, respectively. Traffic frequency values 340 and 344-349 correspond to [TS0] 300 and [TS4] 304-[TS9] 309, respectively. Traffic frequency f has been normalized and is dimensionless.

In an embodiment, the rank-ordered list is truncated to a length M. The top M prefix groups are also referred to as the top M heavy hitters. This step limits the search space and, therefore, reduces the computational resources and computational time for traffic filtering. The value of M is specified by the network administrator, based, for example, on heuristic criteria. For example, a selection rule may be simply "select the top 5 heavy hitters". Another selection rule, for example, may be based on the observed distribution of f In FIG. 3, for example, the bulk of the traffic is generated by sources in prefix group [TS0] 300 (f=28,342 340); whereas, the second ranked prefix group [TS4] 304 has a much lower value of traffic frequency (f=7568 344). One option would be to select only [TS0] 300 and discard the rest (that is, set M=1).

Returning to the flowchart in FIG. 2(a), in an embodiment, the traffic patterns within prefix groups [TS0] 300 and [TS4] 304-[TS9] 309 are analyzed in more detail (step 210). Prefix subgroups are generated according to criteria specified by the network administrator. The process then passes to step 212, in which a structured list containing prefix subgroups rank ordered by traffic frequency is generated. Returning to the example shown in FIG. 3, within [TS0] 300, all of the traffic is generated by three specific prefix subgroups (in this instance, individual hosts), [TS1] 301-[TS3] 303. For [TS1] 301-[TS6] 306, the values of f range from 9995 341-4013 346; whereas, the value of f drops to 1427 347 for [TS7] 307. In the example shown in FIG. 3, prefix groups [TS4] 304-[TS9] 309 are not decomposed into prefix subgroups, but, in general, they may be.

As discussed above, a prefix subgroup may also refer to the complete prefix group, and a prefix subgroup may contain only a single element. In FIG. 3, a structured list comprising prefix subgroups rank ordered by traffic frequency contains the entries [TS1] 301-[TS9] 309. The prefix subgroup with the highest traffic frequency is at the top of the list. Returning to FIG. 2(a), in step 214, the top M prefix subgroups are selected. It is now reasonable to set M=6 on the basis of the distribution off values for the prefix subgroups. The output of step 214 is referred to as the network blacklist 216, which, in this example, contains the top 6 prefix subgroups, [TS1] 301-[TS6] 306.

Note that the rank order of prefix subgroups does not necessarily need to preserve the rank order of the parent prefix groups. For example, if [TS1]-[TS6] have the f values (9000, 5000, 4000, 7000, 6000, 3000), the structured list with rank-ordered prefix subgroups would be ([TS1],[TS4],[TS5], [TS2],[TS3],[TS6]).

In FIG. 2(b), a customer whitelist, containing wanted traffic sources, is generated. In step 232, traffic filter system TFS 140 receives records containing the customer historical usage pattern 230 for each individual customer. This information, for example, may be acquired from network logs and various network operations systems databases. The customer historical usage pattern 230 is analyzed, and a customized list of wanted traffic sources for each individual customer is determined. The output of step 232 is referred to as the customer whitelist 234. Wanted traffic sources are determined for each individual customer according to criteria specified by the network administrator. For examples, traffic sources with which a customer has repeatedly initiated a session has a high likelihood of being a wanted traffic source. A traffic source which has repeatedly completed TCP (transmission control protocol) sessions also has a high likelihood of being a wanted source. In an embodiment, a customer may also supply the network administrator with a list of wanted sources.

FIG. 2(c) shows a flowchart of steps for generating a customer blacklist for a specific customer. Network blacklist 216 and a customer whitelist 234 (for a specific customer) are acquired as input into TFS 140. In step 240, the traffic sources on network blacklist 216 are compared to the traffic sources on customer whitelist 234. The process then passes to step 242. If a traffic source on network blacklist 216 is also on customer whitelist 234, then the process passes to step 246, and the traffic source is not added to the customer blacklist. If, in step 242, the traffic source in network blacklist 216 is not on the customer whitelist 234, then the process passes to step 244, and the traffic source is added to the customer blacklist. Step 242-step 246 are performed for every traffic source on network blacklist 216. The final output is customer blacklist 248. In general, since customer whitelist 234 may be different for different specific customers, customer blacklist 248 may be different for different specific customers. A customer blacklist is associated with a customer system.

In an embodiment, network blacklist 216, customer whitelist 234, and customer blacklist 248 are updated, either periodically (for example, once per day or once per week) or according to other criteria specified by the network administrator. For example, network blacklist 216 may be updated in response to a network attack by a malicious traffic source. Customer whitelist 234 may be updated upon customer request (for example, wanted traffic is being blocked and needs to be unblocked). Customer blacklist 248 may be updated whenever network blacklist 216 or customer whitelist 236 is updated.

FIG. 2(d) shows a flowchart of steps, in an embodiment, for filtering traffic flows from one or more traffic sources to a customer system. Referring to the network schematic diagram in FIG. 1, traffic sources may include traffic sources TS1 120-TS4 126. Traffic sources may also include other user systems. If user system US1 150 is the customer system of interest, for example, traffic sources may also include user systems US2 152-US4 156. In step 260, traffic filter system TFS 140 monitors the traffic flows across core network 102, access network 104, and access network 106. Traffic flows include the IP address of the traffic source, referred to herein as the source IP address, and the IP address of the destination, referred to herein as the destination IP address (such as the IP address of user equipment USE1 150E). For example, if the traffic flows comprise streams of data packets, the source IP address and the destination IP address may be embedded in fields in the data packets. As discussed above, the IP address of user equipment USE1 150E also identifies the user system US1 150.

In step 262, TFS 140 reads the source IP addresses and the destination IP addresses of the traffic flows and filters the traffic flows by source IP address and destination IP address. The process then passes to step 264, in which TFS 140 accesses the customer blacklist (such as customer blacklist 248) associated with the customer system identified by the destination IP address (such as the IP address of USE1 150E (and also US1 150), which is operated by the specific customer of interest). The process then passes to step 266, in which the source IP address (such as the IP address of TSE1 120E) is compared against the list of traffic source IP addresses on the customer blacklist. If the source IP address is on the customer blacklist, then the process passes to step 270, and the traffic is blocked. If the source IP address is not on the customer blacklist, then the traffic passes to step 268 and the traffic is allowed. Note that a source IP address is on the customer blacklist if it falls within the range of one of the prefix subgroups on the customer blacklist. As discussed above with respect to FIG. 1, traffic may be blocked/allowed at various nodes specified by the network administrator.

Figure 4:
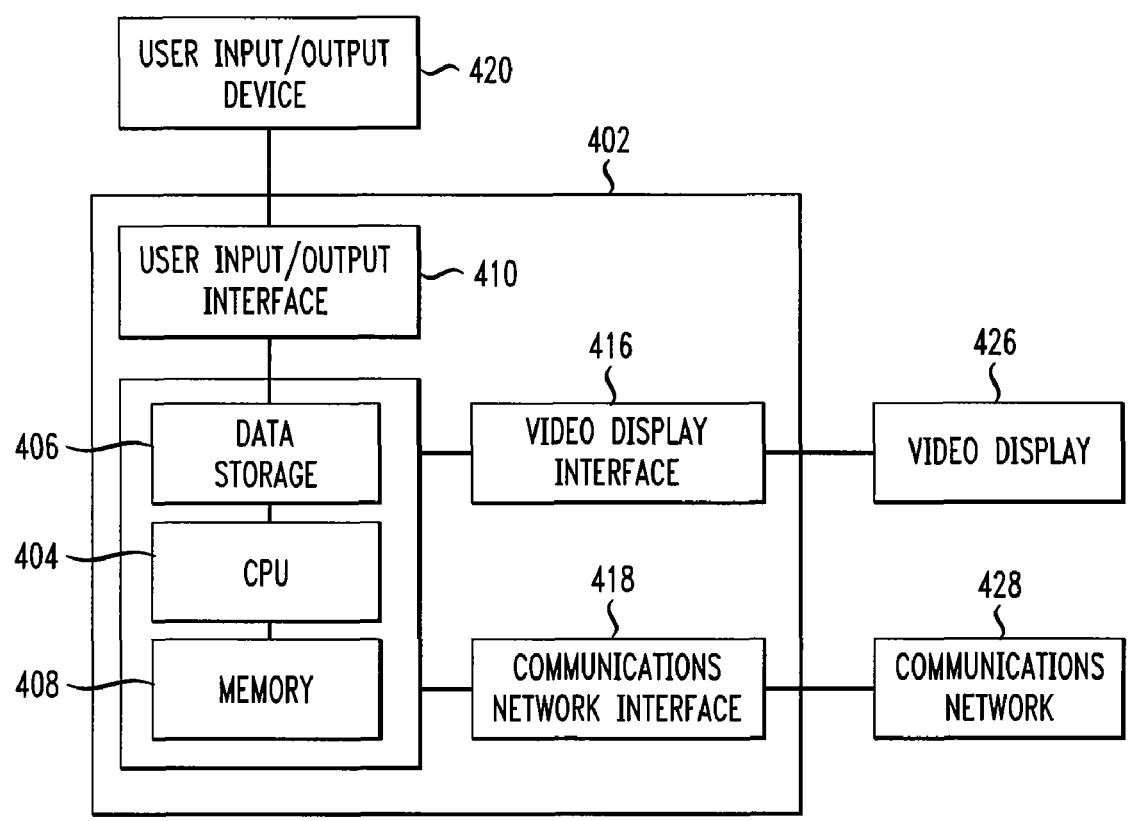
FIG. 4 shows a high-level schematic of a computer which may be used to implement a traffic filter system.

One embodiment of a traffic filter system, such as TFS 140 in FIG. 1, may be implemented using a computer. In an embodiment, the steps shown in the flowcharts of FIG. 2(a)-FIG. 2(d) may be performed by a computer. As shown in FIG. 4, computer 402 may be any type of well-known computer comprising a central processing unit (CPU) 404, and computer readable medium such as memory 408, data storage 406, and user input/output interface 410. Data storage 406 may comprise a hard drive, non-volatile memory, or other computer readable media. User input/output interface 410 may comprise a connection to a keyboard or mouse. Computer 402 may further comprise video display interface 416, which may transform signals from CPU 404 to signals which may drive video display 426. Computer 402 may further comprise communications network interface 418, which may connect computer 402 to IP communications network 428, such as core network 102 in FIG. 1.

As is well known, a computer operates under control of computer software which defines the overall operation of the computer and applications. CPU 404 controls the overall operation of the computer and applications by executing computer program instructions which define the overall operation and applications. The computer program instructions may be stored in data storage 406 and loaded into memory 408 when execution of the computer program instructions is desired. For example, the computer program instructions for executing the steps described in the flowcharts shown in FIG. 2(a)-FIG. 2(d) may be stored in data storage 406. The filter table shown in FIG. 3 may also be stored in data storage 406.

Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for generating a customer blacklist associated with a customer system, comprising:
generating, at a computer, a network blacklist comprising a first plurality of internet protocol addresses, the first plurality of internet protocol addresses identifying a plurality of unwanted traffic sources;
generating a customer whitelist based on analyzing a customer historical usage pattern including traffic sources with repeatedly completed sessions and traffic sources with repeated initiated sessions, the customer whitelist comprising a second plurality of internet protocol addresses, the second plurality of internet protocol addresses identifying a plurality of wanted traffic sources;
comparing each internet protocol address in the first plurality of internet protocol addresses with each internet protocol address in the second plurality of internet protocol addresses; and
for each internet protocol address in the first plurality of internet protocol addresses:
adding the internet protocol address to the customer blacklist if the internet protocol address is not in the second plurality of internet protocol addresses; and
not adding the internet protocol address to the customer blacklist if the internet protocol address is in the second plurality of internet protocol addresses;
wherein generating a network blacklist further comprises:
acquiring a raw blacklist comprising a third plurality of internet protocol addresses identifying a third plurality of unwanted traffic sources;
sorting the third plurality of internet protocol addresses according to prefix groups with a network-specified prefix length selected based on network-specified heuristics;
rank ordering the prefix groups according to traffic frequency including number of connection attempts over a time interval; and
selecting a set of top prefix groups based on the rank ordering for inclusion in the network blacklist.

2. The method of claim 1, further comprising:
monitoring a traffic flow from a traffic source identified by a source internet protocol address to the customer system, wherein the customer system is identified by a destination internet protocol address;
comparing the source internet protocol address with the customer blacklist;
blocking the traffic flow if the source internet protocol address is on the customer blacklist; and
allowing the traffic flow if the source internet protocol address is not on the customer Blacklist.

3. The method of claim 2, wherein blocking the traffic flow further comprises:
blocking the traffic flow at a node.

4. The method of claim 1, wherein acquiring a raw blacklist further comprises:
accessing a reputation system.

5. The method of claim 1, wherein generating a network blacklist further comprises:
populating a filter table with the top prefix groups.

6. The method of claim 1, wherein generating a network blacklist further comprises:
acquiring a raw blacklist comprising a third plurality of internet protocol addresses identifying a third plurality of unwanted traffic sources;
sorting the third plurality of internet protocol addresses according to prefix groups with a network-specified prefix length;
analyzing traffic patterns within each prefix group generating prefix subgroups based at least on the prefix groups and the analyzed traffic patterns;
rank ordering the prefix subgroups according to traffic frequency; and
selecting the top network-specified prefix subgroups.

7. A non-transitory computer readable medium storing computer program instructions for generating a customer blacklist associated with a customer system, the computer instructions comprising:
generating a network blacklist comprising a first plurality of internet protocol addresses, the first plurality of internet protocol addresses identifying a plurality of unwanted traffic sources;
generating a customer whitelist based on analyzing a customer historical usage pattern including traffic sources with repeatedly completed sessions and traffic sources with repeated initiated sessions, the customer whitelist comprising a second plurality of internet protocol addresses, the second plurality of internet protocol addresses identifying a plurality of wanted traffic sources;
comparing each internet protocol address in the first plurality of internet protocol addresses with each internet protocol address in the second plurality of internet protocol addresses; and
for each internet protocol address in the first plurality of internet protocol addresses:
adding the internet protocol address to the customer blacklist if the internet protocol address is not in the second plurality of internet protocol addresses; and
not adding the internet protocol address to the customer blacklist if the internet protocol address is in the second plurality of internet protocol addresses;

wherein generating a network blacklist further comprises:
- acquiring a raw blacklist comprising a third plurality of internet protocol addresses identifying a third plurality of unwanted traffic sources;
- sorting the third plurality of internet protocol addresses according to prefix groups with a network-specified prefix length selected based on network-specified heuristics;
- rank ordering the prefix groups according to traffic frequency including number of connection attempts over a time interval; and
- selecting a set of top prefix groups based on the rank ordering for inclusion in the network blacklist.

8. The non-transitory computer readable medium of claim 7, wherein the computer instructions for generating a customer blacklist further comprises computer program instructions comprising:
- monitoring a traffic flow from a traffic source identified by a source internet protocol address to the customer system, wherein the customer system is identified by a destination internet protocol address;
- comparing the source internet protocol address with the customer blacklist;
- blocking the traffic flow if the source internet protocol address is on the customer blacklist; and
- allowing the traffic flow if the source internet protocol address is not on the customer Blacklist.

9. The non-transitory computer readable medium of claim 8, wherein the computer program instructions defining the step of blocking the traffic flow further comprises computer programming instructions comprising:
- blocking the traffic flow at a node.

10. The non-transitory computer readable medium of claim 7, wherein the computer program instructions defining the step of acquiring a raw blacklist further comprises computer program instructions comprising:
- accessing at least one reputation system.

11. The non-transitory computer readable medium of claim 7, wherein the computer program instructions defining the step of generating a network blacklist further comprises computer program instructions comprising:
- populating a filter table with the top prefix groups.

12. The non-transitory computer readable medium of claim 7, wherein the computer program instructions defining the step of generating a network blacklist further comprises computer program instructions comprising:
- acquiring a raw blacklist comprising a third plurality of internet protocol addresses identifying a third plurality of unwanted traffic sources;
- sorting the third plurality of internet protocol addresses according to prefix groups with a network-specified prefix length;
- analyzing traffic patterns within each prefix group generating prefix subgroups based at least on the prefix groups and the analyzed traffic patterns;
- rank ordering the prefix subgroups according to traffic frequency; and
- selecting the top network-specified prefix subgroups.

* * * * *